W. A. KIRBY.
Harvester.
No. 1,495. Reissued June 9, 1863.
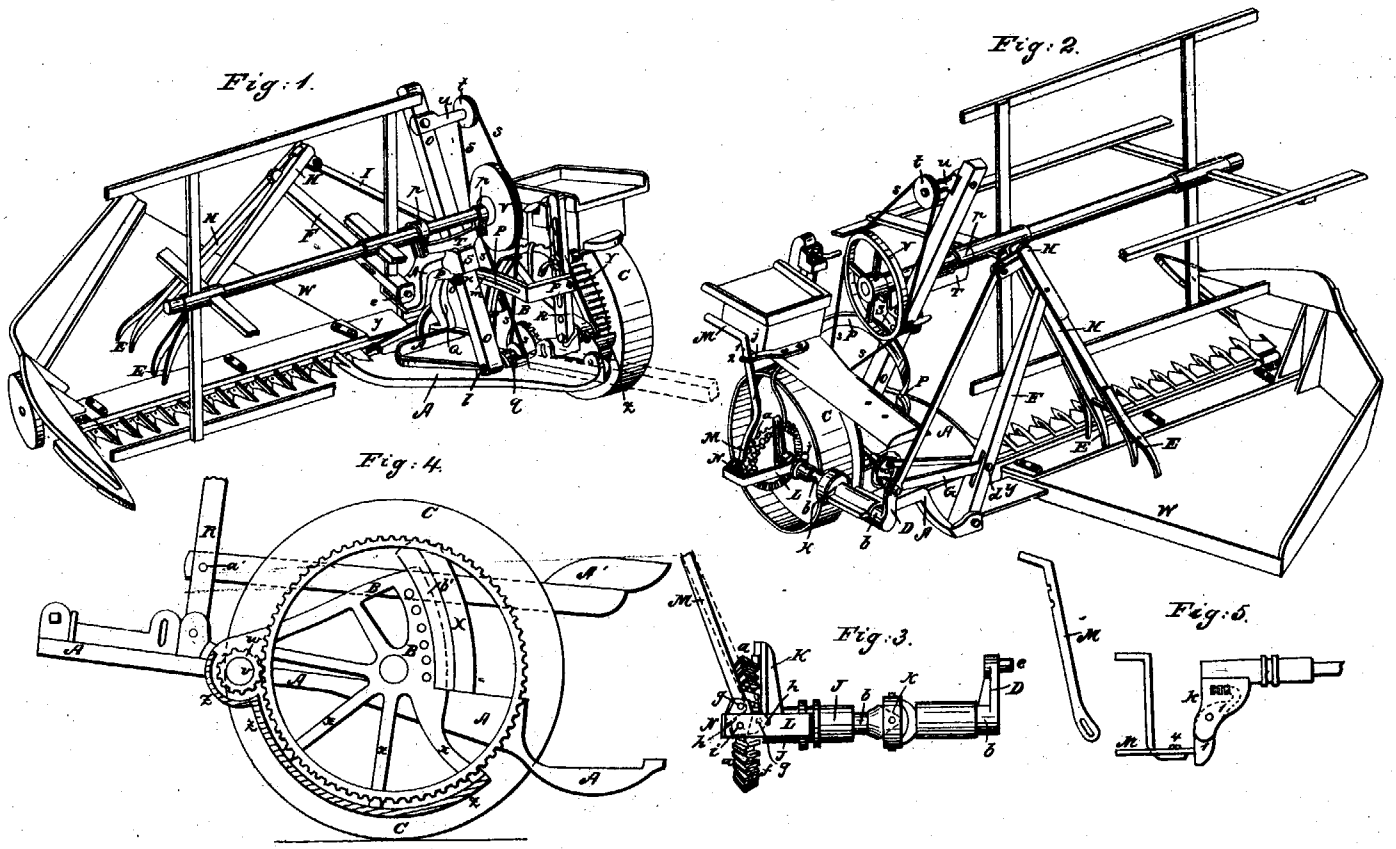
Witnesses:
J. Cohen
John Hirth.
Inventor:
William A. Kirby.
By Atty A. R. Stoughton.
N. PETERS. Photo-Lithographer, Washington, D. C.

UNITED STATES PATENT OFFICE.

WILLIAM A. KIRBY, OF BUFFALO, AND DAVID M. OSBORNE, OF AUBURN, NEW YORK, ASSIGNEES OF SAID WM. A. KIRBY.

IMPROVEMENT IN HARVESTING-MACHINES.

Specification forming part of Letters Patent No. 32,736, dated July 2, 1861; Reissue No. 1,495, dated June 9, 1863.

DIVISION D.

*To all whom it may concern:*

Be it known that WILLIAM A. KIRBY, of Buffalo, in the county of Erie and State of New York, did invent certain new and useful Improvements in Harvesting-Machines and the Raking Apparatus thereof; and we do hereby declare that the following is a full, clear, and exact description of one of his said improvements, reference being had to the accompanying drawings, making a part of this specification, in which—

Figures 1 and 2 represent perspective views of a harvesting-machine, taken, respectively, from the front and rear of said machine. Fig. 3 represents a portion of the rake-gearing detached and on an enlarged scale. Fig. 4 represents a side view of the main frame and main driving-wheel, to show the manner of arranging the shields on the frame to protect the gearing that runs close to the ground. Fig. 5 represents a modification of the devices for throwing the rake in and out of gear with the driving-gear of the machine.

Owing to the difference in the height as well as the density of the crop on the ground, it is necessary in machine-harvesting that the reel should be capable of being set higher up, lower down, farther forward, or farther back, as the condition of the crop may require; and where these many adjustments are to be made it is very difficult to keep the belt uniformly strained, so as to drive the reel at any or all of its adjusted positions.

To so arrange the driving-belt as to admit of the raising or lowering of the reel or the swinging of it more toward or from the grain, or both the raising or lowering and the swinging forward or backward of the reel, is the object and purpose of this part of the said invention; and the invention consists in running an endless belt around two pulleys, one of which is adjustable, and interposing the reel-pulley between them, so that the reel-pulley shall deflect the belt, and by the impingement of the belt on opposite sides of the reel-pulley give motion to the reel.

To enable others skilled in the art to make and use this invention, we will proceed to describe the same as follows:

O is a reel-post. It is bolted to the main frame at *l*, so that it may, when necessary, be moved on this bolt or fastening to swing the reel farther into, toward, or from the standing grain. A guide and supporting piece, P, is connected to the main frame or to uprights Q R on the main frame, and has a curved slot, *m*, in it, so that by means of a nut and bolt, *n*, the reel-post may be adjusted and supported by this guide-piece. This makes the reel-post rigid and firm when adjusted, and the nuts run up on its bolts. Upon the reel-post is fixed or placed a buckle or slide, S, which, for convenience, is clamped to the reel-post at any proper height by a cam-lever, *o*, which makes the slide easily adjustable on the reel-post. A yoke, T, is formed on or connected to this slide, that has two bearings, *p p*, one upon each of its ends, in which the reel-shaft U is supported and turns. No outside reel-post is represented, nor, indeed, need one be used with this construction of reel-supporter. The reel-shaft and the reel are driven from a pulley, *q*, which may be on the same shaft with the bevel-gear 10, which gear receives its motion from the main driver C. Around this pulley *q*, and around a loose pulley, *t*, arranged on an arm, *u*, near the top of the reel-post, passes an endless belt, *s*, as shown in Fig. 1, and for tightening up the belt the pulley *t* or its arm *u* may be adjustable on the reel-post. The pulley V on the end of the reel-shaft is much larger than the pulleys *q t*, and is placed inside the belt *s*, so as to deflect said belt from a straight line, and thus cause the belt to impinge upon said pulley V, taking into its groove and thus driving said pulley and the reel by the friction of the belt against said pulley on diametrically opposite sides of it. When the reel is raised or lowered the belt will continue to drive it without adjustment of the belt. If, however, the belt stretches by wear, then it can be tightened up by the straining-pulley *t*. Nor will the tension of the belt be changed by turning the reel-post on its bolt *l* to swing the reel farther toward or from the standing grain, because said bolt is in a line with the center of the pulley *q*, and the post is always radial to that central line.

Having thus fully described the nature, object, and purpose of this part of the said

KIRBY'S invention, what is claimed under this patent is—

1. Driving the reel of a harvesting-machine by means of a pulley placed within an endless belt, so as to spread apart the belt, and thus be driven by the friction of the belt on diametrically opposite sides of said pulley, this arrangement admitting of an easy adjustment of the reel without loosening the belt, substantially as described.

2. Placing a tightening-pulley above the reel-pulley for the purpose of allowing the reel-with the reel-pulley attached, to be raised and lowered to points between the driving-pulley and the tightening-pulley without materially affecting the tension of the belt, and thus avoiding the necessity of changing its length, substantially as described.

WM. A. KIRBY.
D. M. OSBORNE.

Witnesses:
J. H. OSBORNE,
H. N. LESTER.